Dec. 16, 1941.  R. J. BERRY ET AL  2,266,458
METHOD OF COVERING FLANGES
Filed Nov. 13, 1940
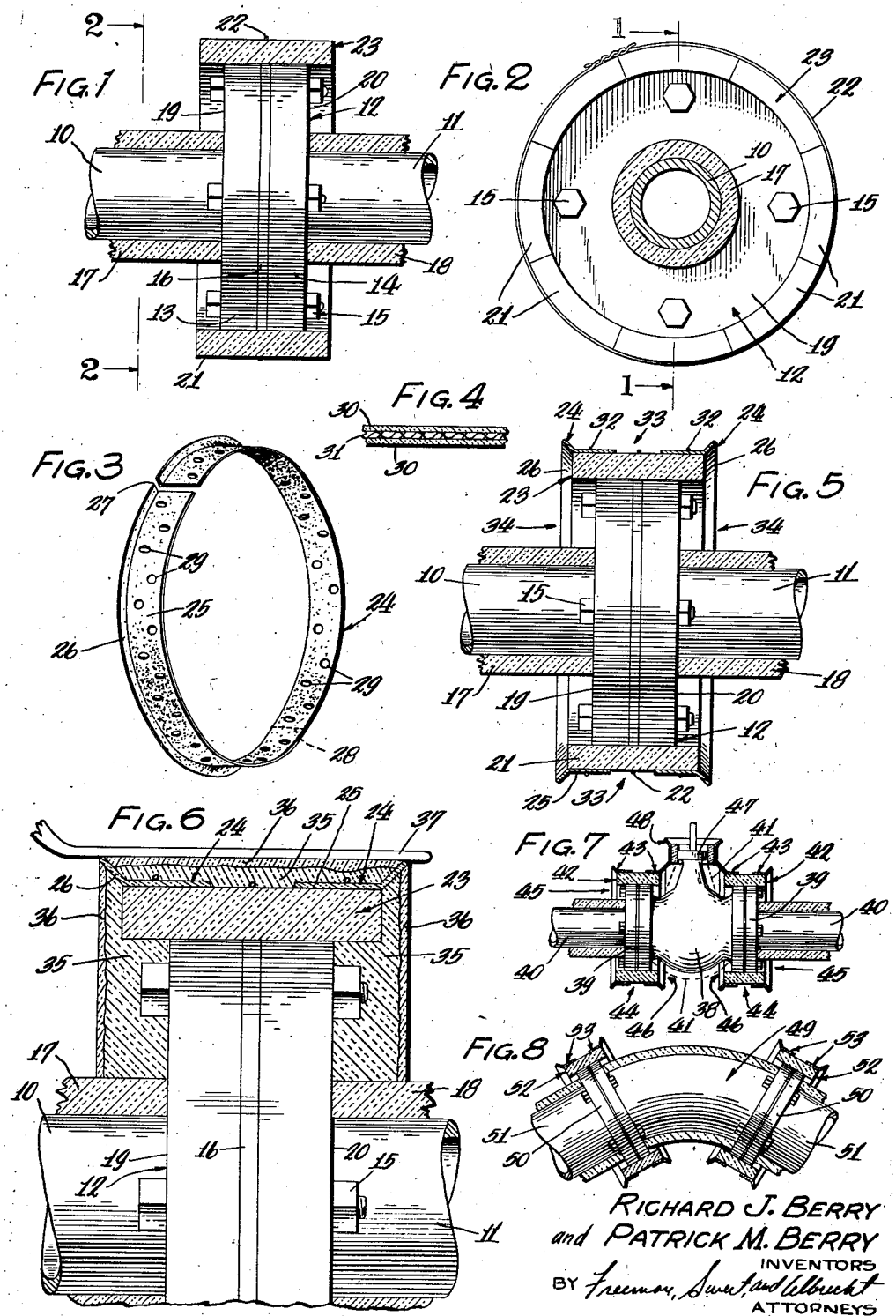
Richard J. Berry
and Patrick M. Berry
INVENTORS
BY Freeman, Swet and Albrecht
ATTORNEYS Patented Dec. 16, 1941

2,266,458

UNITED STATES PATENT OFFICE 2,266,458

METHOD OF COVERING FLANGES

Richard J. Berry, Lakewood, and Patrick M. Berry, Mentor-on-the-Lake, Ohio

Application November 13, 1940, Serial No. 365,506

3 Claims. (Cl. 25—154)

This invention relates to methods of means for covering flanges or the like, and particularly with relation to covering pipe, valve, elbow, and other flanges or the like with an insulating cover. The principal object of this invention is to provide new and improved methods of and means for covering flanges or the like.

In the drawing accompanying this specification, and forming a part of this application, there is shown, for purposes of illustration, one embodiment which my invention may assume, and in this drawing:

Figure 1 is a fragmentary elevational view of a partially covered pipe flange, the view corresponding generally to the line 1—1 of Figure 2, Figure 2 is a transverse sectional view corresponding generally to the line 2—2 of Figure 1, Figure 3 is a perspective view of a means used in covering the pipe flange, Figure 4 is a fragmentary sectional view illustrating a step in the method of making the means shown in Figure 3, Figure 5 is a sectional view, similar to Figure 1, with the means shown in Figure 3 in proper position, Figure 6 is an enlarged fragmentary sectional view showing a pipe flange that has been covered, and Figures 7 and 8 respectively illustrate the application of the invention in the covering of a valve and an elbow connection.

Generally, the invention comprises a method of positioning means with respect to a flange, or the like, in such manner as to form guide means defining a contour of the desired exterior surface of the flange covering, and adding the covering material about the flange, using the guide means as a form for shaping the covering material. Also, the invention comprises the provision of guide means to be used in the method just referred to.

For purposes of illustration, a particular means and method are shown in the drawing and described herein, and although such means and method are preferable, it is to be understood that the invention is not limited to this particular disclosure.

Referring particularly to Figures 1 through 6, the invention is therein illustrated as applied to the covering of a pipe flange. As shown, pipes 10 and 11 have a flange connection 12, and for this purpose are respectively provided with flange heads 13 and 14, connected in any suitable manner, such as by nut and bolt connections 15 herein shown. Usually a gasket 16 is interposed between the flange heads 13 and 14.

The pipes 10 and 11 may act as a conduit for any fluid matter, and in the particular construction herein shown and described, the pipes are adapted to carry steam or hot water, although it will be appreciated that the pipes may carry any other fluid, such for example, water at ordinary temperatures, or a cooling medium. It is desirable to cover the pipes 10 and 11, as well as the flange 12, for many reasons, such as to improve their appearance, to prevent deleterious reaction with anything in the surrounding area, to prevent heat or cold loss from the medium carried by the pipes, and for other reasons.

In the case herein shown, since the pipes carry a heated medium, the covering about the pipes and the flange is preferably of a heat insulating and fireproof nature. Accordingly, the pipes 10 and 11 are each provided with a respective covering 17 and 18, which may be of any suitable material, and preferably comprises an asbestos or magnesia covering which is commercially provided in longitudinally split tubular sections, and such sections are secured to the pipes in any suitable manner, and are preferably so positioned that the extremities of the sections adjacent the opposite faces 19 and 20 of the flange 12 are positioned in close proximity to such faces. If desired, the coverings 17 and 18 may have an outer surface cover of canvas or muslin (not shown), secured thereabout in any suitable manner.

Heretofore, in a preferred manner of covering the flange 12, insulating material, preferably in the form of high temperature magnesium or asbestos blocks 21, and in some instances in the form of air cell blocks, has been positioned peripherally about the flange 12 and held in position, as by means of a wire 22 tightened about the blocks 21, as best shown in Figure 2. The blocks 21 are either of preformed arcuate shape, or are bent to arcuate shape, so that the assembly provides a generally cylindrical insulating covering 23, the end margins of which preferably extend beyond the planes including the opposite faces 19 and 20 of the flange 12.

To complete the covering, a workman was heretofore required to close the ends of the cylindrical covering 23, as well as to trim up the exterior contour of the flange covering. This was usually done by covering the periphery and closing the open ends of the cylindrical covering 23 with an insulating cement. However, to produce a trim appearance, required by all careful construction requirements, the workman needed extraordinary skill, and even then required a considerable amount of time to trim up the flange covering, such as for instance to produce substantially square corners and smooth and non-bulging surfaces.

By the use of this invention, the time and skill required to produce a trim, acceptable, and workmanlike job is considerably reduced. The invention is shown as applied to the generally cylindrical covering 23, although in view of what has been previously mentioned, it will be understood that such particular application, although desirable, is not essential.

Referring particularly to Figure 3, there is shown a band 24, having a generally flat portion 25, and an angularly bent marginal portion 26. The band 24 is shown as shaped to generally cylindrical form, and is split at 27 to permit spreading and positioning of the band about the flange 12. To facilitate spreading or opening movement, and to prevent fracturing of any position of the band, the band is formed with a weakened transversely extending place 28, preferably diametrically opposite the split 27, as best shown by the dotted lines in Figure 3. The flat portion may have a plurality of staggered apertures 29, formed therein throughout its extent.

The band 24, in the case when the pipes 10 and 11 carry a heated medium, is preferably of high temperature insulating material, having characteristics similar to the characteristics of the insulating blocks 21, so that the dangers and destruction which might be caused by differential expansion is avoided. One way to make the band 24 is to secure strips of asbestos paper 30, or the like, (see Figure 4) to opposite sides of a cloth 31, such as canvas or muslin, the cloth being preferably of 3 or 4 ounce size. The asbestos paper 31 is held to the cloth by a cement or paste, such as silicate of soda, either in liquid or paste form. Then the secured paper and cloth is put into a mold (not shown) having mold cavities formed to produce the angularly bent marginal portion 26, and if desired, any particular peripheral shape of the band, such as the cylindrical shape herein shown. The mold is heated, in any suitable way, to dry the secured paper and cloth so that it will hold the shape given by the mold cavities. The flat portion 25 may then be perforated, to provide the apertures 29, and preferably another coat of cement or paste, such as the silicate of soda hereinbefore mentioned, is applied to all exterior surfaces, and this cement is permitted to dry.

Referring particularly to Figure 5, a pair of bands 24 is positioned peripherally about the cylindrical insulating cover 23, preferably in such manner that the angularly bent marginal portions 26 extend upwardly of and beyond the adjacent marginal surface of the cover 23. The bands 24 may be held in position in any suitable manner, such as by staples, or by wires 32 as herein shown. As clearly seen in Figures 5 and 6, the bands 24, by reason of the angularly bent marginal portions 26, cooperate to form a channel or recess 33 extending peripherally about the flange 12, and in this case peripherally about the cylindrical insulating cover 23, and each band 24 forms a channel or recess 34 with respect to the faces 19 and 20 of the flange 12. The flange 12 is now ready to receive the material which completes the covering, and it will be appreciated that the angularly bent marginal portions provide guide means constructed and arranged to define a contour of the desired exterior surface of the flange covering, and such guide means may be used as a form for shaping the covering material.

The material which completes the covering is preferably of a formable nature, and as shown in Figure 6, such material is herein shown in the form of a cement or paste, which in the case where the pipes 10 and 11 carry heated medium, may be an asbestos, magnesia, or any other suitable insulating cement. Preferably, a rough coat 35 of cement is first introduced into the channels 33 and 34, in such quantity so as not to completely fill the respective channel. This is preferable, since it is not always possible to maintain a smooth exterior surface when the coat of cement 35 dries, because, for example, of the certain amount of absorption qualities possessed by the insulating blocks 21 and the bands 24.

The silicate of soda on the exterior surfaces of the band 24, when moistened by the cement 35, gets sticky, and causes the cement 35 to adhere to the band. Also, it will be appreciated that the cement fills the apertures 29, and is thus further held against displacement from the channel 33. After the rough coat 35 is dried, or set sufficiently so as not to alter its exterior surface, a finish coat of cement 36, which may be similar to the cement forming the coat 35, is placed in the remaining space in the channels 33 and 34, preferably in such quantity as to more than complete the filling of the remaining space.

The workman may now take his forming tool, such as the trowel 37 shown in Figure 6, and wipe peripherally about the flange covering, using the upturned edges of the pair of bands 24 as guide and gauge means, so as to remove excess cement and produce a smooth symmetrical exterior peripheral surface. The workman may then wipe his shaping tool over the finishing cement in the channels 34, using the upturned edge of the respective band 24 as a guide and gauge means, so as to remove excess cement and produce a smooth plane surface that is generally square (in the case herein shown) with the exterior peripheral surface formed after the shaping of the cement in the channel 33. Thus it will be seen, that by the use of a small amount of care and time, the flange 12 is provided with a perfect and trim covering.

Referring to Figure 7, there is shown a valve which is set up to be covered with cement in the manner hereinbefore described. The valve comprises a valve body 38, having flange connections 39 with pipes 40. The body 38 of the valve may be covered with insulating material, as shown by the dotted lines 41, in any suitable manner. Each of the flanges 39 is provided with a cylindrical covering 42 and bands 43, similar to the covering 23 and bands 24 hereinbefore described, forming peripherally extending channels 44, and forming complete face channels 45 with the outwardly directed face of each flange 39, and as herein shown, forming incomplete face channels 46 with the inwardly directed face of each flange 39. As before, cement is placed into each of the channels and leveled off as described, the cement in the incomplete channels 46 merging with the cement about the insulating 41 covering the valve body 38. The packing gland construction 47 may also be covered in the manner hereinbefore described, a single band 48, in this case having its opposite edge margins turned upwardly, provides a channel for receiving the cement. As seen in Figure 7, the lowermost edge margin of the band 48 is so positioned as to substantially form a continuation of the adjacent margins of the bands 43. At this point it is to be noted that any of the channels may be formed by a single band, similar to the band 48, and of a width commensurate with the requirements of the cover.

In Figure 8, there is shown an elbow construction 49, having flange connections 50 with pipes 51. Each of the flanges 50 is provided with a cylindrical covering 52 and a pair of bands 53, similar to the covering 23 and bands 24 hereinbefore described, and providing peripheral and face channels for receiving cement in the manner before pointed out.

From the foregoing it will be apparent to those skilled in the art that we have accomplished at least the principal object of our invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:

1. The method of covering a flange and the like, comprising: positioning a pair of angular cross-sectional bands peripherally about the flange in such manner that the bands cooperate to form a channel extending peripherally about the flange, introducing into the channel a formable covering material, and shaping the formable covering material, using peripheral surfaces of the bands as a means for guiding the shaping operation.

2. The method of covering a flange and the like, comprising: covering the periphery of the flange with a generally cylindrical heat insulating body in such manner that opposite marginal surfaces of said body extend at least to the planes including the faces of the flange; positioning a pair of bands peripherally about said body, each band being formed of heat insulating material and having a ring portion and an angularly outwardly bent marginal portion, and securing each band in position wherein its bent marginal portion overhangs a respective one of the marginal surfaces of said body, so that each bent marginal portion defines a channel with respect to the adjacent flange face, and the bent marginal portions cooperate to form a channel extending peripherally about said body; introducing a heat insulating cement into each of the channels in quantity sufficient to at least completely fill each channel; and leveling off the cement, using the edge of the bent marginal portions as guides and gauges for the leveling tool.

3. The method of covering a flange and the like, comprising: covering the periphery of the flange with a generally cylindrical heat insulating body in such manner that opposite marginal surfaces of said body extend at least to the planes including the faces of the flange; positioning a pair of bands peripherally about said body, each band being formed of heat insulating material and having a ring portion and an angularly outwardly bent marginal portion, and securing each band in position wherein its bent marginal portion overhangs a respective one of the marginal surfaces of said body, so that each bent marginal portion defines a channel with respect to the adjacent flange face, and the bent marginal portions cooperate to form a channel extending peripherally about said body; introducing an initial amount of heat insulating cement into each of the channels in quantity short of filling each channel; permitting such initial cement to dry; introducing an additional amount of heat insulating cement into each channel in such quantity to more than fill each channel; and leveling off the excess cement, using the edge of the bent marginal portions as guides and gauges for the leveling tool.

RICHARD J. BERRY.
PATRICK M. BERRY.